United States Patent
Piekarski et al.

(10) Patent No.: US 11,118,302 B2
(45) Date of Patent: *Sep. 14, 2021

(54) LINT-RETAINING FILTER FOR LAUNDRY WASHING MACHINES AND LAUNDRY WASHING MACHINE

(71) Applicant: Electrolux do Brasil S.A., Curitiba (BR)

(72) Inventors: Marcelo Piekarski, Curitiba (BR); Luiz Carlos Pazinato, Curitiba (BR); Fabiano Costi, Curitiba (BR); Oscar Luiz Madalena, Curitiba (BR); Eduardo Orthmann, Curitiba (BR); Eduardo De Menezes Lino Modesto, Curitiba (BR); Vicente Marconcin Vanhazebrouck, Curitiba (BR); Adriano Bonatto Cardozo, Curitiba (BR)

(73) Assignee: Electrolux do Brasil S.A.

( * ) Notice: Subject to any disclaimer, the term of this patent is extended or adjusted under 35 U.S.C. 154(b) by 418 days.

This patent is subject to a terminal disclaimer.

(21) Appl. No.: 15/959,969

(22) Filed: Apr. 23, 2018

(65) Prior Publication Data
US 2018/0313023 A1    Nov. 1, 2018

(30) Foreign Application Priority Data
Apr. 27, 2017   (BR) ................. 102017008949-5

(51) Int. Cl.
| | |
|---|---|
| *D06F 39/10* | (2006.01) |
| *B01D 33/11* | (2006.01) |
| *D06F 23/04* | (2006.01) |
| *D06F 39/08* | (2006.01) |
| *D06F 13/02* | (2006.01) |

(52) U.S. Cl.
CPC .............. *D06F 39/10* (2013.01); *B01D 33/11* (2013.01); *D06F 23/04* (2013.01); *D06F 13/02* (2013.01); *D06F 39/083* (2013.01)

(58) Field of Classification Search
CPC ....................................................... D06F 39/10
See application file for complete search history.

(56) References Cited

U.S. PATENT DOCUMENTS 2,976,711 A    3/1961   Smith

FOREIGN PATENT DOCUMENTS

| BR | 102012030892 A2 | 9/2014 |
|---|---|---|
| MU | 88025241 U2 | 7/2010 |

*Primary Examiner* — Jason Y Ko
(74) *Attorney, Agent, or Firm* — RatnerPrestia

(57) ABSTRACT

A lint filter for a laundry washing machine and a laundry washing machine comprising the same. The lint-retaining filter has at least one filtering surface defining filter walls and a plurality of washing liquid intake openings, the intake openings being oriented toward at least one of the directions of rotation of the mechanical agitator. A laundry washing machine with this filter is also provided with the filter located in a mechanical agitator concentrically mounted on a washing basket of the laundry washing machine.

19 Claims, 9 Drawing Sheets

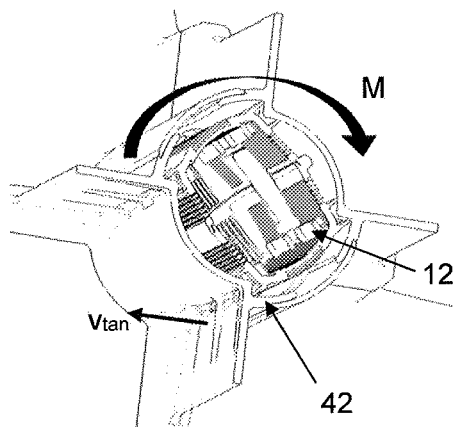
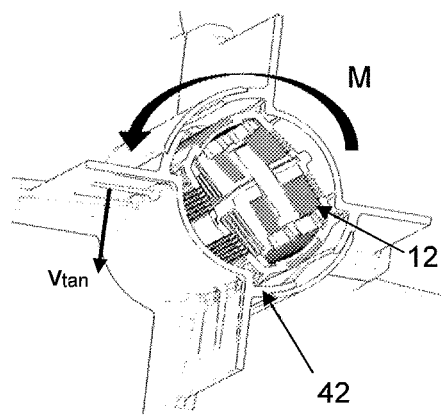
Fig. 11A    Fig. 11B
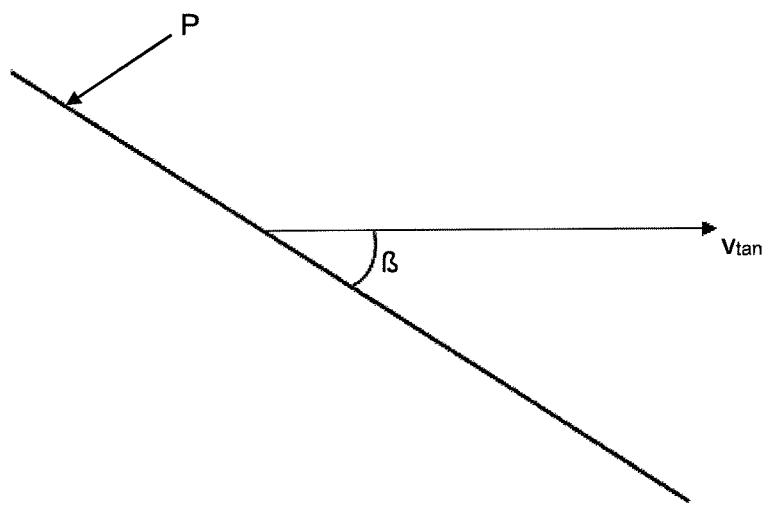
Fig. 12

LINT-RETAINING FILTER FOR LAUNDRY WASHING MACHINES AND LAUNDRY WASHING MACHINE

This application claims the benefit of and priority to Brazil Patent Application No. 10 2017 008949-5, filed Apr. 27, 2017, which is incorporated by reference herein.

FIELD OF THE INVENTION

This invention relates to a lint-retaining filter for a laundry washing machine and a laundry washing machine comprising the same. The lint-retaining filter is equipped with a geometry having an optimized filtering surface capable of preparing the washing liquid to be received on the filtration surface and making it easy to clean.

BACKGROUND OF THE INVENTION

Laundry washing machines are household, commercial or industrial equipment widely employed to assist in the task of cleaning garments or fabrics in general, due to their practicality and time-saving features provided to the user.

Laundry washing machines are usually provided with a main cabinet, a washing basket and an input dispenser, also comprising in some models a mechanical agitator and a lint filter.

It is known that laundry washing machines of the type comprising a mechanical agitator have their washing efficiency increased due to the movement caused by the mechanical agitator. The mechanical agitator is concentrically mounted to the washing basket and rotates, generally reciprocatingly, for the purpose of moving the washed textile article and the washing liquid, enhancing the passage of washing liquid through the textile articles and the release of grime impregnated into the fibers of the fabrics, thereby increasing washing efficiency.

Laundry washing machines fitted with a mechanical agitator are commonly provided with a top feed, i.e., they comprise an upper lid that gives access to the washing basket. The washing basket is in the area where the textile articles and washing liquid are located.

Washing liquid is a mixture of water and any type of soap, bleach, fabric softener or laundry compounds, blended at any ratio. Furthermore, textile articles are understood to mean any type of clothing, towels, sheets or other articles composed of textile material which one wishes to wash with the aid of a laundry washing machine.

It is also known that mechanical agitators comprise openings in their wall to allow the washing liquid to enter therein, where a filter is housed which has the function of retaining lint, dirt and any other elements suspended in the liquid which may be retained from the washed articles.

The lint filter is the component responsible for retaining lint pieces, dirt and other bodies suspended in the washing liquid that may attach to the washed laundry. Because it is undesirable, lint should be removed from the washing liquid to the greatest extent possible, so that clothing, when removed from the machine after washing, has as little lint as possible to ensure user satisfaction.

Therefore, there are a number of Prior Art washing filters which seek to provide an optimized solution in lint filtration by means of different constructive configurations of said filter.

Document U.S. Pat. No. 2,976,711 relates to a filter mounted inside a mechanical agitator of a laundry washing machine, the filter being formed by a perforated mesh peripherally placed within the agitator provided with openings in its wall. Thus, the washing liquid has the suspended lint retained in the perforated mesh as it passes through the interior of the agitator. Such a solution, however, does not provide for the removal of the filter, so that after a high amount of soils is accumulated, the filter stops operating.

Document MU8802524-1 relates to an associated filter at the lower end of a rod housable within a mechanical agitator, the filter having a truncated-conical shaped geometry and the end of the rod opposite the filter mounting comprising an ergonomic handle to induce and assist the user to remove the filter from the interior of the agitator for periodic cleaning. A similar construction of this type of solution is shown in FIGS. 1A and 1B.

Meanwhile, document MU8802524-1, although allowing the removal of the filter for periodic cleaning, due to the fact that the filter is integral with the cleaning rod, offers moderate difficulty to the user. In addition, this type of filter has its filtering efficiency limited by the area of the filter body, which needs to be reduced in depth to allow the user to reach the entire internal area for cleaning.

Document BR102012030892-4 relates to a filter for laundry washing machines of the type which is placed inside a mechanical agitator and comprises an elongated geometry provided with a filtering surface, in addition to a plurality of bristles placed along of its length to act as an additional filtering element. Such a solution, however, has the lint retained on its outer surface, which can cause dirt to fall into the agitator when the filter is removed for periodic cleaning. Moreover, their cleaning presents a high degree of difficulty, since the lint tends to entangle in the bristles, demanding time and ability to perform the cleaning.

Therefore, in none of the Prior Art is there a laundry washing machine provided with a lint filter which provides a high filtration efficiency, coupled with easy cleaning. Furthermore, none of the Prior Art solutions make use of the rotary motion of the agitator to optimize the passage of the washing liquid through the filtration element.

OBJECTIVES AND DESCRIPTION OF THE INVENTION

Therefore, it is an object of this invention to provide a high efficiency lint filtration filter for laundry washing machines in comparison to Prior Art solutions.

Another objective of this invention is to provide a lint filter for a laundry washing machine which is easy to clean, allowing the user to perform a simplified and efficient maintenance of the filter.

One or more of the foregoing objectives of this invention are achieved by a lint filter for a laundry washing machine, comprising a geometry capable of enabling optimum admission of washing liquid therein from the rotational movement performed by the laundry washing machine's mechanical agitator.

One or more objectives of this invention are achieved by means of a lint-retaining filter of a mountable type within a mechanical agitator, comprising at least one filtering surface, defining filter walls, and at least one intake opening for the washing liquid, the intake openings being oriented in accordance with the directions of rotation of the mechanical agitator.

One or more of the objectives of this invention are achieved by means of a lint-retaining filter wherein the position of the opening is delimited by a plane defined by the intersection of at least two areas of the edge of the intake opening, forming an angle in relation to a vector of tangential speed with rotary movement, generally speaking (but not necessarily) toggled to the agitator starting from said opening, the angle being defined between 15° and 90°, preferably between 30° and 90°, and more preferably 90°. Further in particular, said plane is defined by the intersection of at least two areas of the edge of the openings opposite each other.

Other ranges of angle variation can be set between: 20° and 90°; 30° and 90°; 40° and 90°; 50° and 90°; 60° and 90°; 70° and 90°; or 80° and 90°.

One or more objectives of this invention are achieved by means of a lint-retaining filter comprising a split body having a first part and a second part connectable to each other to facilitate removal of accumulated dirt inside the filter.

One or more objectives of this invention are achieved by means of a lint-retaining filter comprising a retaining vane placed immediately behind each of the intake openings in order to direct the washing liquid to the inner area of the liner, and to prevent the return of said liquid to the area external to the filter and furthermore, the vanes being placed in openings opposite each other, preventing that the washing liquid that enters the filter through a first opening from exiting the interior of the filter by means of a second opening opposite the first.

One or more objectives of this invention are achieved by means of a lint-retaining filter wherein the retention vanes comprise a geometry provided with a flat portion and two deflecting portions, in particular the deflecting portions being oriented towards the inner area of the filter.

One or more objectives of this invention are achieved by means of a lint-retaining filter wherein said first part and said second filter part are pivotally mounted to each other, further comprising a locking member.

One or more objectives of this invention are achieved by means of a lint-retaining filter associated with a handle to allow and facilitate removal of the filter from the interior of the agitator for periodic cleaning.

One or more objectives of this invention are achieved by means of a filter having multiple filtration areas along the filtering surface, with filtration characteristics that are different from each other, in order to retain soils of different types or dimensions in each filter area, depending on the conditions of use of the filter, the type of washing liquid used and/or any possible needs of the project. The multiple filtering areas can be defined by portions of the filtering surface provided with different mesh size openings (Mesh), geometry and/or different materials, enabling different levels of filtering to be performed in each area of the filtering surface, depending on the characteristics desired in the project.

One or more objectives of this invention are achieved by means of a lint-retaining filter having a geometry defined by a hollow body elongated along a longitudinal axis, in particular comprising intake openings placed parallel to the longitudinal axis of the filter, in order to increase the intake area that allows the washing liquid to enter the filter.

One or more objectives of this invention are achieved by means of the intake openings and the filtering surfaces of the filter are placed interposed along the surface of the lint-retaining filter so as to distribute substantially homogeneously the intake and filtering areas of the washing liquid over the length of the external surface of the filter.

One or more objectives of this invention are achieved by means of a filter having guide elements to facilitate assembly within the agitator and to maintain the filter in its correct position of operation throughout the operation of the laundry washing machine. In particular, the guide elements are defined by pairs of projections placed along the length of the filter, wherein the groove defined between the pair of projections being engageable with projections placed from the inner area of the agitator.

One or more objectives of this invention are achieved by means of a laundry washing machine provided with a washing basket, a feed lid, a mechanical agitator concentrically mounted with the washing basket and a lint-retaining filter mounted on the inside of the mechanical agitator, the lint filter of said laundry washing machine being provided with a plurality of openings to intake the washing liquid, oriented towards at least one of the two directions of rotation of the mechanical agitator.

One or more objectives of this invention are achieved by means of a laundry washing machine whose lint-retaining filter comprises the position of the opening delimited by a plane defined by the intersection of at least two areas of the edge of the intake opening forming an angle relative to a tangential velocity vector of rotational movement of the agitator starting from said opening, the angle being defined between 15° and 90°, preferably 30° to 90°, and most preferably 90°.

Other ranges of angle variation can be set between: 20° and 90°; 30° and 90°; 40° and 90°; 50° and 90°; 60° and 90°; 70° and 90°; or 80° and 90°.

One or more objectives of this invention are achieved by means of a laundry washing machine whose filter is defined by a split body having a first part and a second part mutually associated, further comprising a retaining vane placed immediately behind each of the intake openings.

Thus, the filter of this invention comprises a geometry defined by a hollow body, provided with openings for the intake of the washing liquid and filtering surfaces for the retention of lint and other undesirable soils from the washing liquid, which are detached from the washed articles. For the purposes of this invention, the filtering surface is understood as having a porous surface, the pores of which comprise openings having a reduced area, defined according to the level of purity to be obtained from the washing liquid.

The filter openings of this invention are oriented so as to prepare the washing liquid therein as a function of the rotational movement performed by the mechanical agitator, i.e., it makes use of the rotational movement of the agitator to optimize the intake of the washing liquid inside the filter.

During the washing step, in order to increase the interaction between the textile articles and the washing liquid, the mechanical agitator performs an alternating rotational movement, which causes the washing liquid to move towards the intake direction or towards the filter output direction. Thus, in order to prevent the washing liquid that enters the filter after the rotating movement of the agitator in one direction from being expelled from inside the filter when the agitator performs a movement in the opposite direction, retaining vanes are placed immediately behind of the openings.

Thus, immediately after entering the filter, the washing liquid passes through the retaining vanes and has its flow directed to the filtering surfaces, where the flow into the area external to the filter is enabled. At this point, the grime and lint suspended in the washing liquid is retained on the filtering surface in the internal area of the filter and the washing liquid returns to the washing area.

The vanes are placed so as to hinder the passage of the washing liquid in the outlet direction and facilitate the passage of the liquid in the intake direction and may also comprise a geometry which enhances this effect, for example: vanes with edges shaped as arched borders, shells, or any other equivalent geometry.

Since the filter of this invention has a hollow geometry and performs soil retention on its inner surface, access to its inner area is required so that periodic filter cleanings are possible. One way to provide access to the internal area of the filter is by means of a detachable two-way construction, which allows the user to clean the internal surface of the filter, eliminating dirt and ensuring the maintenance of filtration efficiency.

In order to further increase the efficiency of the filter, it is possible to increase its filtering surface area, in particular by increasing the length of the filter along the internal area of the agitator.

BRIEF DESCRIPTION OF THE DRAWINGS

The objectives, technical effects and advantages of this invention will be apparent to those skilled in the art from the following detailed description with reference to the accompanying Figures, which illustrate exemplary but not limiting embodiments of the invention.

FIGS. 11A and 11B illustrate one embodiment of the filter 12 mounted inside an agitator 42 shown in cross-section, in the condition in which the agitator 42 performs a rotary motion M, FIG. 11A depicting this effect as long as the rotary motion is clockwise, and FIG. 11B representing this effect when the rotational movement is counterclockwise.

FIG. 12 shows a schematic representation of the relationship between the plane formed by the intersection of at least two edge areas of an opening 44 of the filter 12 with the tangential velocity vector $v_{tan}$ relating to the rotational movement performed by the agitator during its operation, defining the angle β.

DESCRIPTION OF EMBODIMENTS OF THE INVENTION

Initially, it should be pointed out that the laundry washing machine, object of this invention, will be described below according to particular but not limiting embodiments, since its embodiment may be realized in different shapes and variations and according to the desired application by the technician in the art.

The laundry washing machine of this invention is of the type that is loaded at the upper area and is provided with a cabinet and at least one opening placed at its top, where the opening gives access to a washing basket comprising a mechanical agitator assembly concentrically mounted to the washing basket.

Figure 1A:
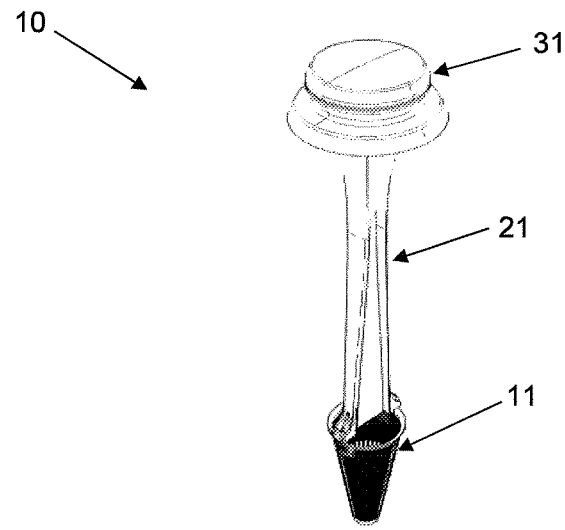
FIG. 1A shows a Prior Art filter assembly 10, comprising a rod 21 provided with a filtration element 11 mounted at its lower end and a handle 31 mounted at its upper end.
Figure 1B:
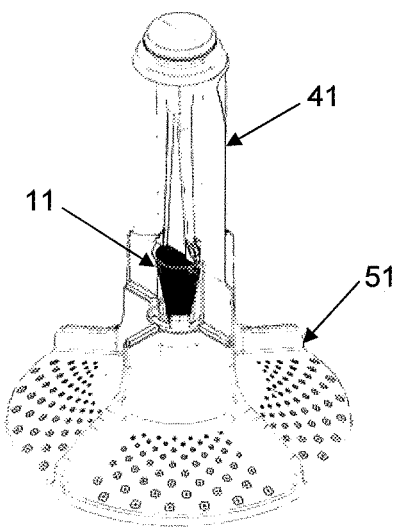
FIG. 1B is a partial cross-sectional view of a mechanical agitator 41, comprising a base 51, of a laundry washing machine comprising a Prior Art filter assembly mounted therein.
Figure 2A:
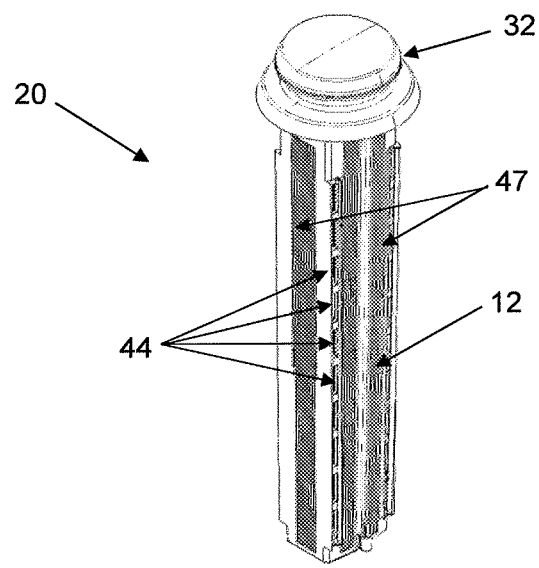
FIG. 2A shows the filter assembly 20 in one embodiment of this invention, comprising a filter 12 provided with a plurality of openings 44, filter surfaces 47 and a handle.
Figure 2B:
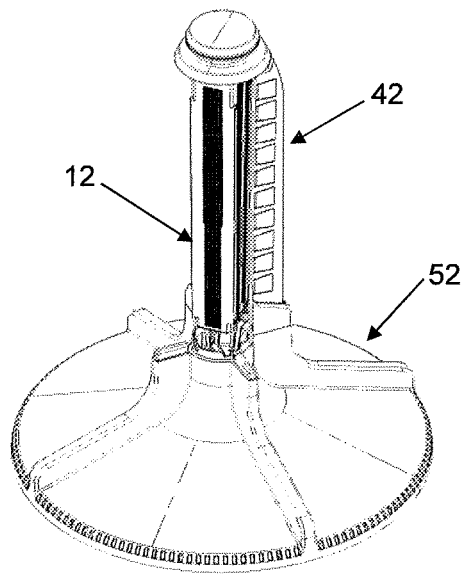
FIG. 2B is a partial cross-sectional view of a mechanical agitator 42, comprising a base 52, of a laundry washing machine comprising a filter assembly of one embodiment of this invention.
Figure 3:
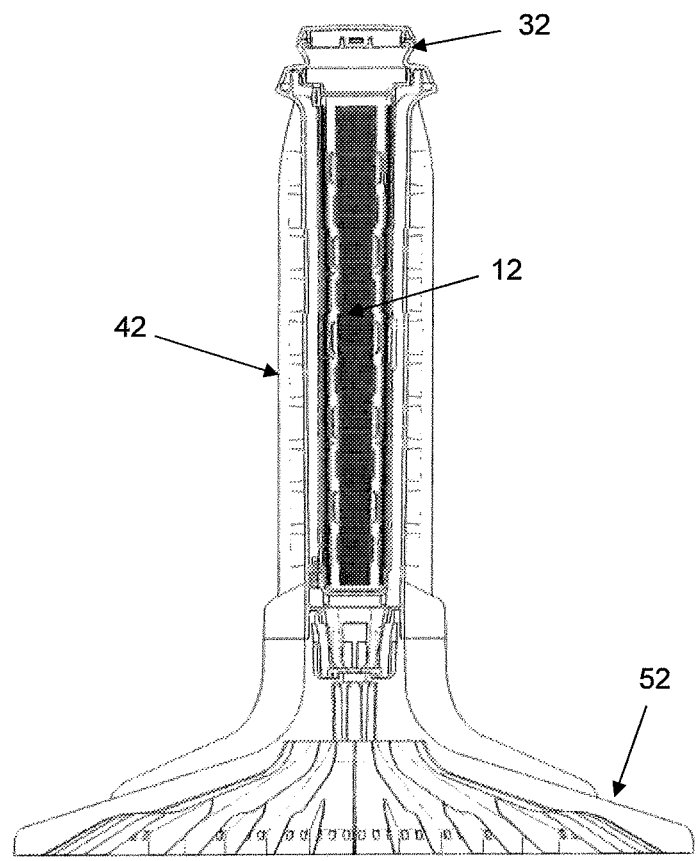
FIG. 3 shows a longitudinal cross-sectional view of a mechanical agitator 42 comprising a filter 12 mounted therein in accordance with one embodiment of this invention.

As shown in FIGS. 2A, 2B and 3, in one embodiment of this invention, the lint-retaining filter 12 of the laundry washing machine is of the type that is mountable inside a mechanical agitator 42 and comprises at least one filtering surface 47 defining filter walls, i.e., filter walls comprising openings dimensioned so as to allow the washing liquid to pass through and retain bodies suspended in the liquid, such as lint and other bodies foreign to the washing process.

The lint filter 12 further comprises at least one washing liquid intake port 44 placed along its length, oriented in accordance with the directions of rotation of the mechanical agitator 42.

More precisely, the intake openings 44 have the functionality of increasing the intake of the washing liquid into the internal area of the filter 12 as a consequence of the rotational movement of the mechanical agitator, i.e., the opening is placed so that the liquid automatically passes through the intake openings 44 when the filter moves.

In particular, the position of the opening 44 of the filter 12 is delimited by a plane P defined by the intersection of at least two areas of the edge of the intake opening 44, forming an angle β with respect to a tangential velocity vector $v_{tan}$ of the rotational movement M of the agitator 42, starting from said opening 44. In this way, the opening 44 is placed offset at an angle β defined between 1° and 90°, preferably 30° to 90°, and more preferably 90°. Such a slope has a direct influence on the volume of washing liquid that is admitted to the filter 12, therefore, although the expected effect is obtained from an angle of 1°, the ideal is that the angle β be as close as possible to 90°.

Figure 4:
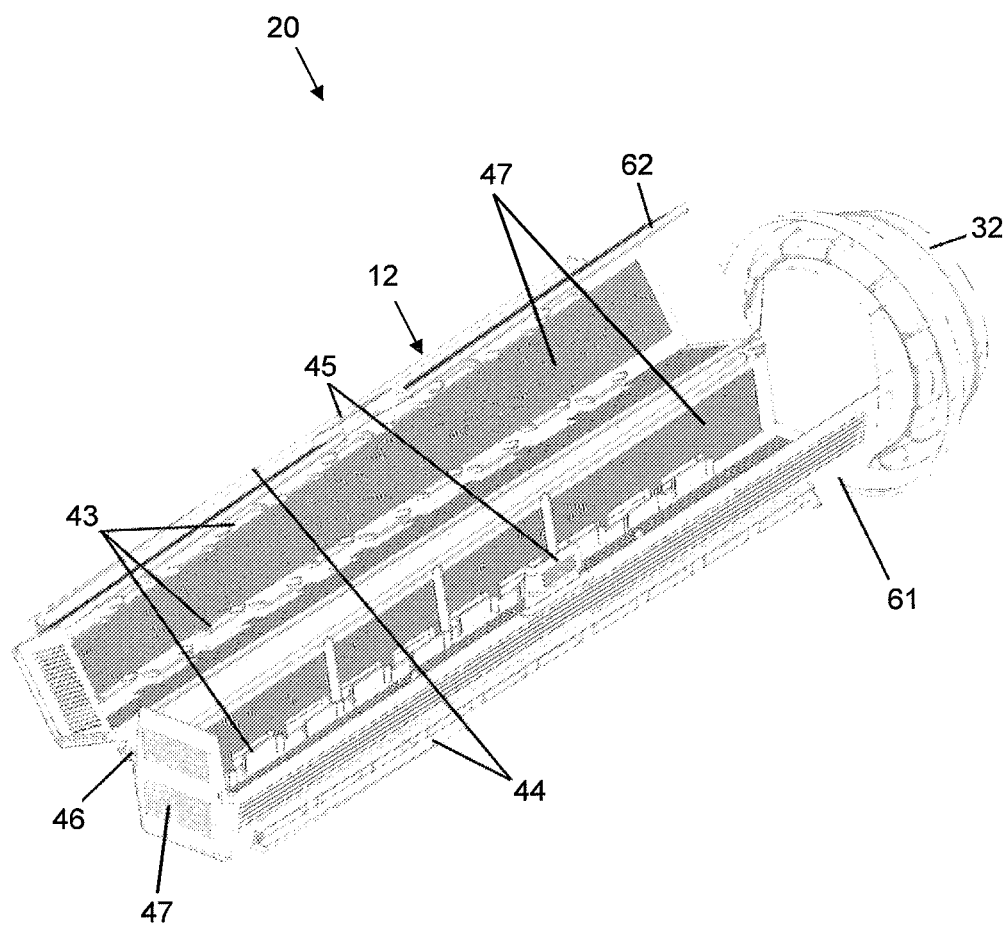
FIG. 4 shows a filter 12, in one embodiment of this invention, comprising a first portion 61 and a second portion 62 pivotally mounted to each other by a hinge 46, being lockable in the closed position by means of a locking member 45.

In an embodiment of the invention, the filter 12 comprises a split body having a first portion 61 and a second portion 62 that are associable with each other, as shown in FIG. 4, wherein the filter 12 is shown in the open condition, with a first part 61 and a second part 62 associated with each other by means of a hinge 46. It should be noted, however, that any other form of movable association of components (e.g., fittings, tabs, rails, or the like) could be adopted without this altering the inventive concept of this invention.

Further, to ensure that the filter 12 remains in the closed position during its operation, in one embodiment of the invention, the first portion 61 and the second portion 62 of the filter 12 are held locked together by a locking member 45, which may be any one defined in the Prior Art, such as straps, fittings or correlated items, as long as it enables the opening and closing of the filter 12 repeatedly, enabling cleaning by the user.

Figure 5:
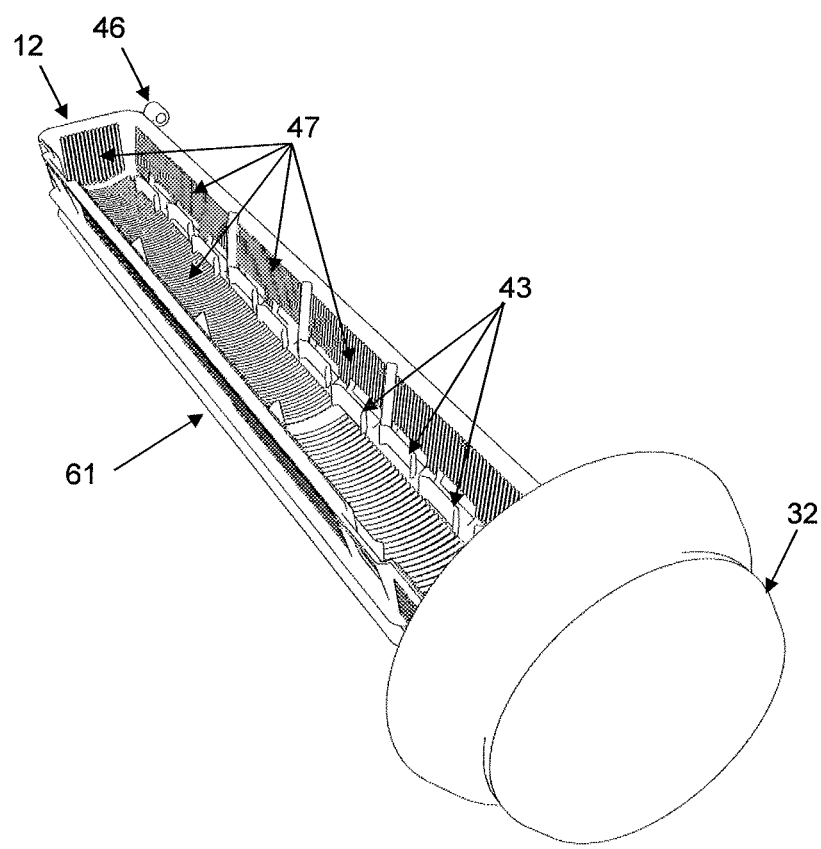
FIG. 5 shows a view in perspective of an embodiment of the filter of this invention, as shown in FIG. 4, however representing the first portion 61 of the filter, in a cleaning or pre-assembly condition of the filter 12.
Figure 6:
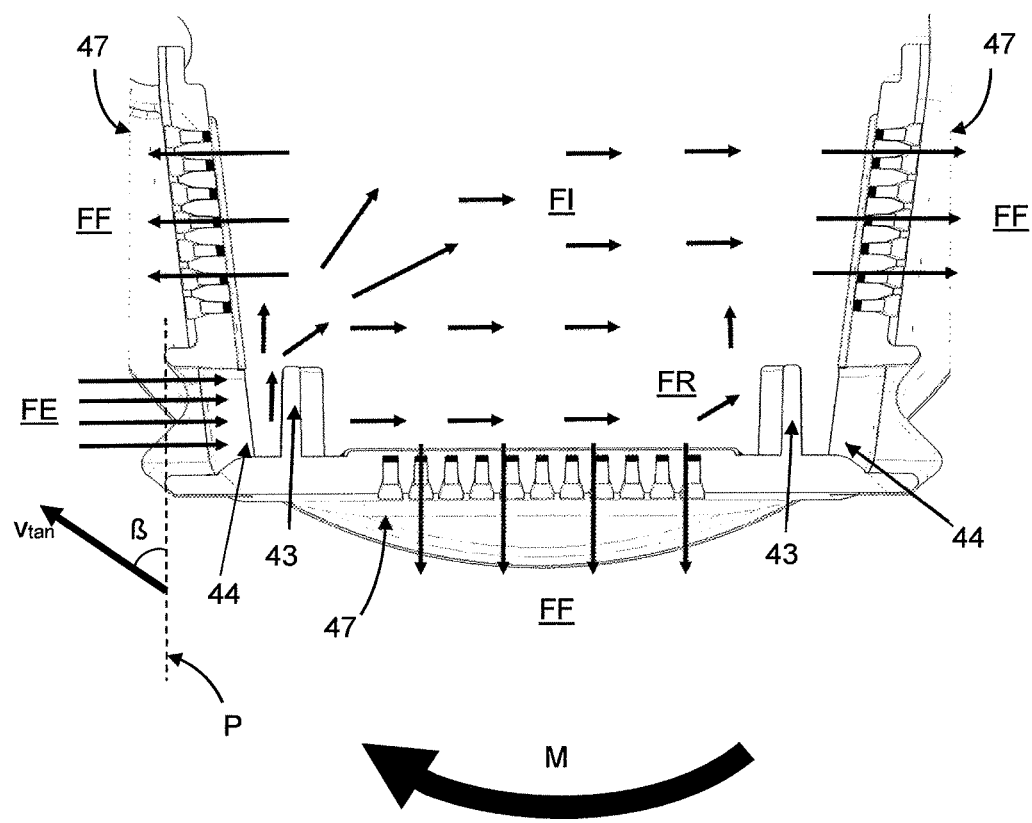
FIG. 6 shows a cross-sectional view of a lower area of the filter 12, according to one embodiment of this invention, showing the flow lines of the washing liquid from its intake through the openings 44, to its outlet in the filter areas 47 of the filter 12.

In one embodiment of this invention, in order to optimize the retention of the washing liquid within the filter 12, the retaining vanes 43 are used and located immediately behind each of the intake openings 44, as shown in FIGS. 4, 5 and 6.

FIG. 6 further shows a detailed cross-sectional view of a portion of the filter 12, indicating the path of movement of the washing liquid through the interior of the filter 12, thanks to the use of the vanes 43, by means of arrows indicative of the direction of the liquid.

More precisely, the openings 44 absorb an intake flow FE which is encountered immediately upon entering the filter 12 with a surface of the vane 43. The vane 43, in turn, directs the washing liquid into the filter 12, defining an internal flow FI that moves within the filter and, upon moving into the intake port 44, generates a return flow FR directed back into the internal flow FI by means of the vanes 43.

In this way, the internal flow FI finds it easy to leave the inner area of the filter 12 solely by means of the filtering surfaces 47, generating the filtration flows FF, conditioning the washing liquid to the external area to the filter 12, returning to the washing basket, and holds the particles suspended in the washing liquid on the filtering surface 47, inside the filter 12.

Additionally, in one embodiment of this invention, the vanes 43 comprise a geometry optimized to enable/facilitate the input stream FE and to bar the return flow FR. An example of geometry of this invention, as shown in FIG. 8, consists of retaining vanes 43 with geometry provided with a flat portion 431 and two deflecting portions 432, the flat portion 431 being placed in the area more to the center of the length of the vane 43 and the deflecting portions 432 placed at the ends of the blade 43.

Figure 7:
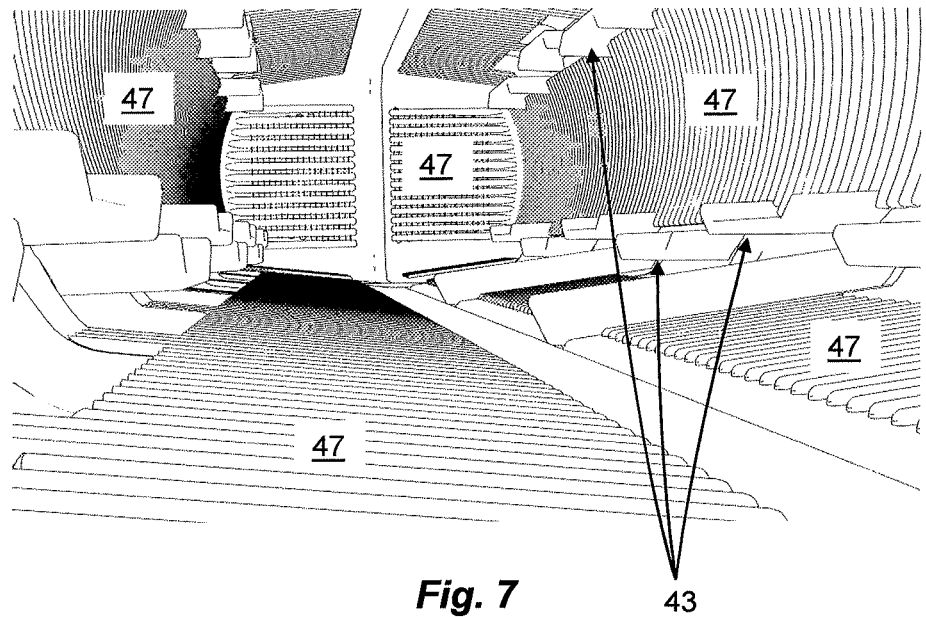
FIG. 7 shows a view of the interior of a filter 12 according to an embodiment of this invention in which the movement and filtering space of the washing liquid is represented as well as the placement of the retaining vanes 43 and filter surfaces 47.
Figure 8:
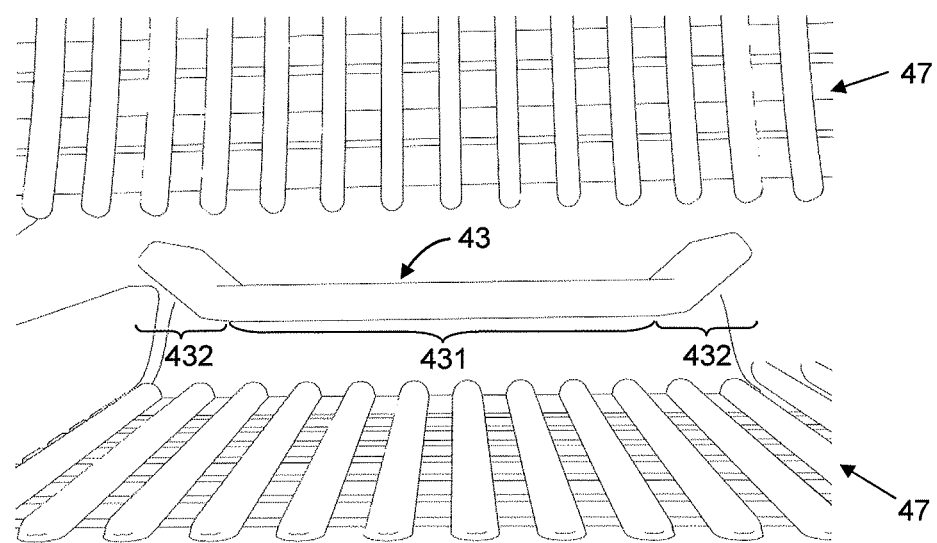
FIG. 8 shows a detailed view of a retaining vane 43, in accordance with an embodiment of this invention.

Further, as shown in FIG. 8, and as can also be seen in FIGS. 4, 5 and 7, the retaining vanes 43 comprise the deflecting portions 432 defined by an arch directed toward the inner area of the filter 12, generating a rounding that conducts the flow of the intake stream FE into the filter 12, and a kind of shell for holding liquid which tends to leave the inner area of the filter 12 by means of the intake openings 44, forming a return flow FR.

In order to facilitate the removal of the filter 12, in one embodiment of this invention, the filter 12 is associated with a handle 32, which makes it possible to attach a handle for the user so as to facilitate removal of the filter assembly 20 as a whole from the interior of the mechanical agitator 42.

In still another embodiment of this invention, the filter comprises portions with through openings of different sizes, defining multiple levels of filtration, i.e., enabling different levels of filtration to be performed in each area of the filter surface 47, depending on the desired design characteristics.

A further object of this invention is a laundry washing machine having a washing basket, a feed lid, a mechanical agitator 42 concentrically mounted with the washing basket and a lint-retaining filter 12 mounted on the interior of the mechanical agitator 42.

Such a laundry washing machine comprising a lint filter 12 provided with a plurality of washing liquid intake openings 44 oriented toward at least one of the rotational directions of the mechanical agitator 42, the filter 12 being also defined by a bipartite body provided with a first portion 61 and a second portion 62 associable with each other, and comprising a retaining vane 43 placed immediately behind each of the intake openings 44.

In particular, the laundry washing machine of this invention comprises the lint-retainer filter with a position of opening 44 delimited by a plane P that is defined by the intersection of at least two edge areas of the intake opening 44, forming an angle β with respect to a tangential velocity vector $v_{tan}$ of the rotational motion M of the agitator 42 starting from said opening 44, as can be seen schematically in FIG. 12 and in one embodiment of the invention, in FIG. 6. The angle β being defined as between 1° and 90°, preferably between 30° and 90°.

Figure 9:
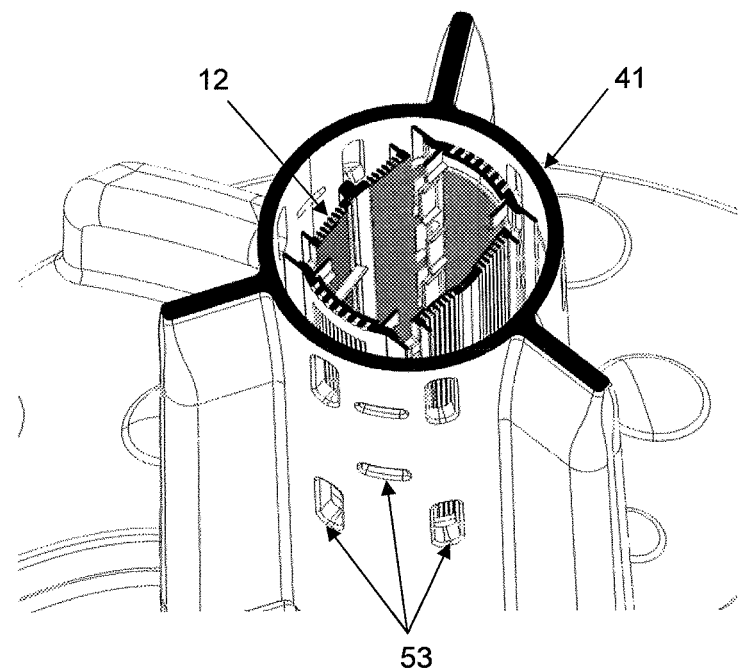
FIG. 9 shows a cross-sectional view of one embodiment in which the lint filter 12 of this invention is inserted into a mechanical agitator 41 with radial openings 53.
Figure 10:
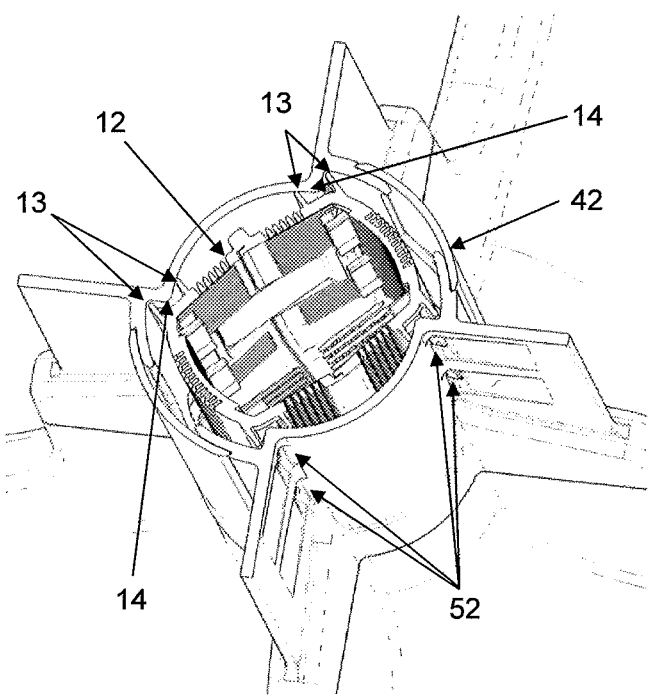
FIG. 10 shows a cross-sectional view of one embodiment in which the lint filter 12 of this invention is inserted into a mechanical agitator with openings 52 oriented in accordance with the openings 44 of the filter.

Further, as can be seen in FIG. 9, the lint filter 12 of this invention may be inserted into a mechanical agitator 41 with radial openings 53, as commonly found in the Prior Art, or a mechanical agitator provided with openings 52 oriented according to the filter openings 44, as shown in FIG. 10.

In further reference to FIG. 10, the mounting guide elements 13 inside the agitator 42 are noted, which have the function of facilitating the correct fit of the filter 12 inside the agitator 42 and that still maintain it in an ideal operational position throughout the laundry washing machine's function in particular by ensuring that the filter 12 remains with its openings aligned with intake openings 52 of the agitator 42.

In this regard, it is a preferred embodiment of this invention in that the intake openings 52 are oriented in accordance with the directions of rotation of a rotary movement M of the mechanical agitator 42, as proposed for the intake openings 44 of the filter 12.

Notwithstanding the description of the particular embodiments above, this invention may be embodied differently and may exhibit modifications in its form of implementation, so that the scope of protection of the invention is limited only by the content of the appended Claims, including all possible equivalent variations.

The invention claimed is:

1. A lint-retaining filter for laundry washing machines, the lint-retaining filter being mountable on the inside of a mechanical agitator and comprising:
    at least one filtering surface defining filtering walls; and
    at least one intake opening for the washing liquid, wherein the lint-retaining filter is oriented, when mounted on the inside of the mechanical agitator, with the at least one intake opening oriented to face a rotational direction of a rotating motion of the mechanical agitator;
    wherein the at least one intake opening lies in a plane that intersects at least two edge areas of the intake opening forming an angle, in relation to a tangential velocity vector of the rotational movement of the agitator starting from said opening.

2. The lint-retaining filter in accordance with claim 1, wherein the angle is defined between 15° and 90°.

3. The lint-retaining filter in accordance with claim 1, wherein the angle is defined between 30° and 90°.

4. The lint-retaining filter according to claim 1, wherein the lint-retaining filter comprises a split body having a first part and a second part which are associated with each other.

5. The lint-retaining filter according to claim 1, further comprising a retaining vane placed immediately behind each of one or more of the intake openings, defining pairs of retaining vanes along the length of the filter.

6. The lint-retaining filter in accordance with claim 5, wherein each of the retaining vanes comprises a flat portion that is parallel with a plane of the respective one of the one or more intake openings, and two deflecting portions extending from respective ends of the flat portion.

7. The lint-retaining filter in accordance with claim 6, wherein the deflecting portions are oriented towards the inner area of the filter.

8. The lint-retaining filter according to claim 4, wherein the first part and the second part of the filter are mounted by hinges to each other, and further comprising a locking member configured to secure the first part to the second part in a closed position.

9. The lint-retaining filter according to claim 1, further comprising a handle.

10. The lint-retaining filter according to claim 1, wherein the filtering surface comprises portions with openings of different sizes, defining multiple levels of filtration.

11. The lint-retaining filter according to claim 1, wherein the filter comprises a hollow body elongated along a longitudinal axis.

12. The lint-retaining filter according to claim 1, wherein the intake openings are placed parallel to the longitudinal axis of the filter.

13. The lint-retaining filter according to claim 1, wherein the intake openings and the filtering surfaces are placed in an interleaved manner along the surface of the lint-retainer filter.

14. The lint-retaining filter according to claim 1, wherein the filter comprises guide elements for mounting inside the agitator.

15. The lint-retaining filter in accordance with claim 14, wherein the guiding elements are defined by pairs of projections placed along the length of the filter, a groove defined between the pair of projections being engageable with projections of the inner area of the agitator.

16. The laundry washing machine according to claim 1, wherein the filter comprises a split body having a first part and a second part which are associated with each other; and a retaining vane placed immediately behind the at least one intake opening.

17. A laundry washing machine comprising:
a washing basket;
a feed lid;
a mechanical agitator mounted concentrically in the washing basket; and
a lint-retaining filter mounted inside the mechanical agitator, the lint-retaining filter comprising:
at least one filtering surface defining filtering walls, and at least one intake opening for the washing liquid, wherein the lint-retaining filter is oriented, when mounted inside of the mechanical agitator, with the at least one intake opening oriented to face a rotational direction of a rotating motion of the mechanical agitator;
wherein at least one intake opening lies in a plane that intersects at least two areas of an edge of the at least one intake opening that form an angle, relative to a tangential velocity vector of a rotational movement of the mechanical agitator starting from the at least one intake opening.

18. The laundry washing machine according to claim 17, wherein the angle is defined between 30° and 90°.

19. The laundry washing machine according to claim 17, wherein the angle is defined between 15° and 90°, and wherein the lint-retaining filter is configured to be positioned inside the mechanical agitator at a location adjacent to the at least one intake opening.

* * * * *